United States Patent
Te Braake et al.

(10) Patent No.: US 8,956,441 B2
(45) Date of Patent: *Feb. 17, 2015

(54) METHOD FOR PROCESSING FISCHER-TROPSCH OFF-GAS

(71) Applicant: Shell Oil Company, Houston, TX (US)

(72) Inventors: Justus Theodorus Gerardus Te Braake, Amsterdam (NL); Maarten Bracht, Amsterdam (NL); Desmond Andrew Bungku, Amsterdam (NL); Wouter David Van De Graaf, Amsterdam (NL); Xander Linders, Amsterdam (NL); Sivakumar Sadasivan Vijayakumari, Amsterdam (NL)

(73) Assignee: Shell Oil Company, Houston, TX (US)

( * ) Notice: Subject to any disclaimer, the term of this patent is extended or adjusted under 35 U.S.C. 154(b) by 168 days.

This patent is subject to a terminal disclaimer.

(21) Appl. No.: 13/660,888

(22) Filed: Oct. 25, 2012

(65) Prior Publication Data

US 2013/0276630 A1 Oct. 24, 2013

(30) Foreign Application Priority Data

Oct. 25, 2011 (EP) .................................. 11186511
Oct. 25, 2011 (EP) .................................. 11186514

(51) Int. Cl.
*B01D 53/047* (2006.01)
*B01D 53/04* (2006.01)
(Continued)

(52) U.S. Cl.
CPC .............. *B01D 53/04* (2013.01); *B01D 53/047* (2013.01); *C10K 1/32* (2013.01); *C10G 2/32* (2013.01); *B01D 53/229* (2013.01); *B01D 2253/102* (2013.01); *B01D 2253/104* (2013.01); *B01D 2253/108* (2013.01); *B01D 2253/116* (2013.01);
(Continued)

(58) Field of Classification Search
USPC ............... 95/96–98, 100, 104, 105, 130, 140; 518/722

See application file for complete search history.

(56) References Cited

U.S. PATENT DOCUMENTS 3,797,201 A   3/1974   Tamura
4,013,429 A   3/1977   Sircar et al.
(Continued)

OTHER PUBLICATIONS

Ribeiro et al., Pressure swing adsorption for CO2 capture in Fischer-Tropsch fuels production from biomass, Oct. 19, 2010, Adsorption (2011) 17, 443-452.
(Continued)

*Primary Examiner* — Frank Lawrence (57) ABSTRACT

A method for producing a gas comprising at least 80 vol % carbon monoxide from a Fischer-Tropsch off-gas comprises: (1) feeding Fischer-Tropsch off-gas through a column comprising an adsorbent bed at high pressure and discharging effluent; (2) reducing the pressure in the column and the bed slightly; (3) rinsing the column and the adsorbent bed with methane or a mixture of methane and carbon dioxide; (4) reducing the pressure of the column and adsorbent bed to a low pressure; (5) rinsing the column and adsorbent bed with a mixture of hydrogen and nitrogen; (6) pressurizing the column and adsorbent bed to a high pressure using a mixture of hydrogen and nitrogen. The product stream obtained in step (3) comprising at least 80 vol % carbon monoxide can be sent as feed to a Fischer-Tropsch reaction. In an embodiment, a gas comprising at least 80 vol % hydrogen is also produced.

19 Claims, 4 Drawing Sheets

(51) Int. Cl.
*C10K 1/32* (2006.01)
*C10G 2/00* (2006.01)
*B01D 53/22* (2006.01)

(52) U.S. Cl.
CPC ......... *B01D 2256/10* (2013.01); *B01D 2256/16* (2013.01); *B01D 2257/502* (2013.01); *B01D 2259/40001* (2013.01); *B01D 2259/40007* (2013.01); *B01D 2259/4062* (2013.01); *B01D 2259/414* (2013.01); *C10G 2300/1022* (2013.01); *C10G 2300/4081* (2013.01)
USPC ....... 95/97; 95/100; 95/130; 95/140; 518/722

(56) References Cited

U.S. PATENT DOCUMENTS

| | | | |
|---|---|---|---|
| 4,375,363 A | 3/1983 | Fuderer | |
| 4,381,189 A | 4/1983 | Fuderer | |
| 4,402,712 A | 9/1983 | Benkmann | |
| 4,539,020 A * | 9/1985 | Sakuraya et al. | 95/101 |
| 4,578,089 A | 3/1986 | Richter et al. | |
| 4,599,094 A | 7/1986 | Werner et al. | |
| 4,726,816 A | 2/1988 | Fuderer | |
| 5,032,150 A | 7/1991 | Knaebel | |
| 5,096,470 A * | 3/1992 | Krishnamurthy | 95/102 |
| 5,112,590 A | 5/1992 | Krishnamurthy et al. | |
| 5,993,517 A | 11/1999 | Chen et al. | |
| 6,045,603 A | 4/2000 | Chen et al. | |
| 6,060,032 A * | 5/2000 | Hable et al. | 423/210 |
| 6,136,070 A * | 10/2000 | Sato et al. | 95/98 |
| 6,572,681 B1 * | 6/2003 | Golden et al. | 95/122 |
| 8,372,375 B2 * | 2/2013 | Nakao et al. | 423/648.1 |
| 8,419,829 B2 * | 4/2013 | Wallace | 95/55 |
| 2004/0077736 A1 | 4/2004 | Steynberg et al. | |
| 2006/0116430 A1 | 6/2006 | Wetink et al. | |
| 2008/0300326 A1 | 12/2008 | Schneider et al. | |
| 2010/0115994 A1 * | 5/2010 | Hayashida et al. | 62/640 |
| 2011/0011128 A1 | 1/2011 | Grover | |

OTHER PUBLICATIONS

PCT International Search Report, Application No. PCT/EP2012/071182 dated Dec. 11, 2012.

* cited by examiner

METHOD FOR PROCESSING FISCHER-TROPSCH OFF-GAS

This application claims the benefit of European application 11186511.9, filed Oct. 25, 2011 and European application 11186514.3, filed Oct. 25, 2011, which are both incorporated herein by reference.

FIELD OF THE INVENTION

The present invention relates to a process for processing Fischer-Tropsch off-gas. Unconverted carbon monoxide is recovered from the Fischer-Tropsch off-gas. In some embodiments unconverted carbon monoxide as well as unconverted hydrogen are recovered from the Fischer-Tropsch off-gas.

The invention especially relates to a process in which recycling of unconverted carbon monoxide, and optionally unconverted hydrogen, to one or more Fischer-Tropsch reactors is optimized.

BACKGROUND OF THE INVENTION

The Fischer-Tropsch process can be used for the conversion of hydrocarbonaceous feed stocks into normally liquid and/or solid hydrocarbons (i.e. measured at 0° C., 1 bar). The feed stock (e.g. natural gas, associated gas, coal-bed methane, residual oil fractions, biomass and/or coal) is converted in a first step into a mixture of hydrogen and carbon monoxide. This mixture is often referred to as synthesis gas or syngas. The synthesis gas is fed into a reactor where it is converted over a suitable catalyst at elevated temperature and pressure into paraffinic compounds ranging from methane to high molecular weight molecules comprising up to 200 carbon atoms, or, under particular circumstances, even more.

The hydrocarbon products manufactured in the Fischer-Tropsch process are processed into different fractions, for example a liquid hydrocarbon stream comprising mainly $C_5+$ hydrocarbons, and a gaseous hydrocarbon stream which comprises methane, carbon dioxide, unconverted carbon monoxide, unconverted hydrogen, and lower hydrocarbons. The gaseous hydrocarbon stream may also comprise nitrogen as the syngas sent to the Fischer-Tropsch reactor may contain some nitrogen.

The gaseous hydrocarbon stream is often referred to as Fischer-Tropsch off-gas. Fischer-Tropsch off-gas can be recycled to the syngas manufacturing or to the Fischer-Tropsch reactor. Sometimes lower hydrocarbons are removed before the off-gas is recycled. Lower hydrocarbons may be removed by decreasing the temperature of the off-gas and then applying a gas-liquid separation. However, when the off-gas is recycled to the syngas manufacturing or to the Fischer-Tropsch reactor, the components in the off-gas which do not take part in the Fischer-Tropsch reaction, such as carbon dioxide, nitrogen and methane, occupy reactor space. The components which do not take part in the Fischer-Tropsch reaction are also referred to as "inerts".

The level of inerts in the Fischer-Tropsch reactor increases with increasing Fischer-Tropsch off-gas recycling. The pace of the build-up of inerts can be reduced by treating the off-gas before it is recycled. When the off-gas is passed through a pressure swing adsorption unit (PSA), it is normally possible to remove carbon dioxide and water from the off-gas. It is often possible to recover a hydrogen stream from the off-gas by means of a PSA unit; the hydrogen stream can be recycled to the Fischer-Tropsch reactor. Nevertheless, common commercial PSA units are often not designed to recover a carbon monoxide stream. And some common commercial PSA units result in a hydrogen stream comprising a significant amount of nitrogen. Therefore it is common to recycle only a relatively small part of the off-gas. One possibility is to recycle a part of the Fischer-Tropsch off-gas to one or more Fischer-Tropsch reactors while another part of the off-gas is used as fuel. A downside of this is that only a part of the carbon atoms of the hydrocarbonaceous feed stock is converted to the desired $C_5+$ hydrocarbons.

U.S. Pat. No. 5,112,590 and U.S. Pat. No. 5,096,470 describe the separation of gases using specific PSA systems with a first PSA unit for producing hydrogen and a second PSA unit for producing carbon monoxide. Such systems may be useful for gas mixtures comprising a relatively high amount of hydrogen. Such systems are, however, not suitable for gas mixtures comprising a relatively low amount of hydrogen, e.g. less than 50 volume % calculated on the total gas mixture. Furthermore, in case of a gas feed comprising a significant amount of nitrogen such systems will not result in the product cuts as described. When, for example, pure hydrogen would be separated using the first PSA, nitrogen would contaminate the intermediate carbon monoxide stream in a system according to U.S. Pat. No. 5,112,590 or U.S. Pat. No. 5,096,470. The systems of U.S. Pat. No. 5,112,590 and U.S. Pat. No. 5,096,470 may therefore be suitable to treat a hydrogen-rich gas mixture exiting a steam methane reformer, but they are not suitable to treat a nitrogen-comprising hydrogen-lean off-gas of a Fischer-Tropsch process.

US20110011128 describes a PSA comprising system in which purified hydrogen is produced using a PSA, which may be a conventional co-purge $H_2$ PSA unit. Such a system may be useful to a hydrogen-rich gas mixture exiting a steam methane reformer, but is not suitable to treat nitrogen comprising hydrogen-lean off-gas of a Fischer-Tropsch process.

US20040077736 mentions a process in which a liquid phase and a vapour phase are withdrawn from a hydrocarbons synthesis stage. In a vapour phase work-up stage, hydrocarbon products having 3 or more carbon atoms may be removed and the residual vapour phase may then pass to a PSA. Using the PSA first, second and optionally third gas components are separated. The first gas component comprises carbon monoxide and hydrogen. The second gas component comprises methane, and the optional third gas component comprises carbon dioxide. The first gas component is recycled to the hydrocarbon synthesis stage. US20040077736 does not provide details on the method PSA method used. A regular use of a normal PSA would result in a relatively low recovery of carbon monoxide in the first gas component, and a build-up of nitrogen in the reactor upon recycling the first gas component to the hydrocarbon synthesis stage.

US20080300326-A1 describes the use of a PSA method to separate Fischer-Tropsch off-gas. The method produces at least one gas stream comprising hydrogen, at least one gas stream mainly comprising methane, and at least one gas stream comprising carbon dioxide, nitrogen and/or argon, and hydrocarbons with at least 2 carbon atoms. The PSA used comprises at least three adsorbent beds: alumina, carbon molecular sieves or silicates, activated carbon, and optionally zeolite. The alumina is used to remove water. The carbon molecular sieves or silicates are used to adsorb carbon dioxide and partially methane. The activated carbon is used to adsorb methane and partially nitrogen and carbon monoxide. Zeolite may be used to adsorb nitrogen, argon and carbon monoxide. The product stream of the PSA mainly comprises hydrogen. The other gas streams are obtained during the decompression phase. Disadvantages of the method of US20080300326-A1 are at least the following. Nitrogen is only partially adsorbed in the PSA. This results in a build-up of nitrogen in the Fischer-Tropsch reactor when the hydrogen stream is used as reactant gas. Also the methane stream comprises nitrogen and thus results in the build-up of nitrogen in the syngas, and thus in the Fischer-Tropsch reactor, when the methane stream is used for generating syngas. Another disadvantage of the method of US20080300326-A1 is that carbon monoxide is only recycled to the Fischer-Tropsch reactor in a limited amount. Carbon monoxide is present in the hydrogen stream and in the methane stream. Nevertheless, at least 50% of the CO initially present in the off-gas ends up in the third stream which is used as fuel.

There is a desire to obtain a pure carbon monoxide stream from Fischer-Tropsch off-gas. Such a pure carbon monoxide stream can then be recycled to the Fischer-Tropsch reactor. This would make it possible to convert most of the carbon atoms of the hydrocarbonaceous feed stock to the desired $C_5+$ hydrocarbons. It is even more desired to additionally obtain a pure hydrogen stream from Fischer-Tropsch off-gas, which may also be recycled to the Fischer-Tropsch reactor.

SUMMARY OF THE INVENTION

The invention provides a method for producing a gas comprising at least 80 vol % carbon monoxide, calculated on the total volume of the gas, from a gas mixture comprising 5-50 vol % methane, 10-50 vol % carbon dioxide, 20-65 vol % carbon monoxide, 10-40 vol % hydrogen and 10-55 vol % nitrogen, calculated on the total volume of the gas mixture, said method comprising, in sequence, the following steps:
(1) feeding a gas mixture through a column comprising an adsorbent bed, said gas mixture comprising 5-50 vol % methane, 10-50 vol % carbon dioxide, 20-65 vol % carbon monoxide, 10-40 vol % hydrogen and 10-55 vol % nitrogen, calculated on the total volume of the gas mixture,
with upon commencement of said feeding, the bed and column being pre-saturated and pre-pressurized to a pressure in the range of 20 to 80 bar absolute (bar a), preferably 30 to 70 bar a, with pure hydrogen, or with a mixture of hydrogen and nitrogen, and
discharging effluent from the other end of said bed, and
continuing said feeding and said discharging until a carbon monoxide comprising gas has reached at least 45% of the length of the bed and has reached at most 80% of the length of the bed, calculated from the end of the bed at which the gas mixture is being fed; and
(2) ceasing the feeding of the gas mixture comprising methane, carbon dioxide, carbon monoxide and hydrogen, and reducing the pressure in the column and the bed with about 5 to 10 bar a; and
(3) rinsing the column and the adsorbent bed by feeding a gas comprising at least 95 vol % methane, or a gas mixture of methane and carbon dioxide, through the column and adsorbent bed,
the column and bed being at a pressure in the range of 15 to 75 bar a, preferably 25 to 65 bar a, more preferably 30 to 55 bar a, and
discharging effluent from the other end of said bed, and
continuing said feeding and said discharging until at least 60% of the carbon monoxide that was present in the bed at the commencement of this rinsing step is discharged from the other end of said bed; and
(4) ceasing the feeding of a gas comprising at least 95 vol % methane, or a gas mixture of methane and carbon dioxide, and reducing the pressure of the column and adsorbent bed to a pressure in the range of 1 to 5 bar a; and
(5) rinsing the column and adsorbent bed by feeding a mixture of hydrogen and nitrogen through the column and adsorbent bed
the column and bed being at a pressure in the range of 1 to 5 bar a, and
(6) pressurizing the column and adsorbent bed to a pressure in the range of 15 to 75 bar a, preferably 25 to 65 bar a, more preferably 30 to 55 bar a by feeding a mixture of hydrogen and nitrogen.

One advantage of the present invention is that the method is suitable to obtain a pure carbon monoxide stream from Fischer-Tropsch off-gas in step (3). This pure carbon monoxide stream can be recycled to the Fischer-Tropsch reactor. This makes it possible to convert most of the carbon atoms of the hydrocarbonaceous feed stock to the desired $C_5+$ hydrocarbons.

The invention is further illustrated in the accompanying drawing.

DETAILED DESCRIPTION OF THE INVENTION

The present invention relates to processing of off-gas obtained from a Fischer-Tropsch reactor in order to convert most of the carbon atoms of the hydrocarbonaceous feed stock to the desired $C_5+$ hydrocarbons. When removed from a Fischer-Tropsch reactor, the Fischer-Tropsch off-gas is generally at a temperature in the range of 40-100° C., preferably in the range of 50-70° C. and at a pressure of 40-80 bar, preferably in the range of 50-70 bar.

Fischer-Tropsch off-gas is typically produced by a Fischer-Tropsch hydrocarbon synthesis process comprising the steps of:
i) conversion of a (gaseous) hydrocarbonaceous feed to obtain synthesis gas (syngas);
ii) catalytic conversion of the synthesis gas obtained in step i) using a Fischer-Tropsch catalyst into a Fischer-Tropsch product; and
iii) separating the Fischer-Tropsch product of step ii) into at least one hydrocarbon product stream and a Fischer-Tropsch off-gas.

Suitably, syngas production methods include steam reforming of natural gas or liquid hydrocarbons and gasification of coal. Methods to convert (gaseous) hydrocarbonaceous feed into syngas include adiabatic oxidative reforming, autothermal reforming and partial oxidation. Preferably, hydrocarbonaceous feed is converted to syngas by partial oxidation at elevated temperature and pressure using an oxygen containing gas. Partial oxidation can take place according to various established processes. Catalytic as well as non-catalytic processes may be used. These processes include the Shell Gasification Process. A comprehensive survey of this process can be found in the Oil and Gas Journal, Sep. 6, 1971, pp 86-90.

The $H_2/CO$ ratio of the syngas is suitably between 1.5 and 2.3, preferably between 1.8 and 2.1. The catalysts used for the catalytic conversion of the mixture comprising hydrogen and carbon monoxide into hydrocarbons are known in the art and are usually referred to as Fischer-Tropsch catalysts. Preferably, the catalysts for use in the Fischer-Tropsch hydrocarbon synthesis process comprises as the catalytically active component cobalt. The catalytically active component is preferably supported on a porous carrier, e.g. silica or titania. If desired, the Fischer-Tropsch catalyst may also comprise one or more metals or metal oxides as promoters. Typically, the catalytic conversion may be effected at a temperature in the range of 150 to 350° C., preferably from 180 to 270° C. Typical total pressures for the catalytic conversion process are in the range of from 1 to 200 bar absolute, more preferably from 10 to 70 bar absolute.

Generally, the Fischer-Tropsch hydrocarbon product stream is separated from the Fischer-Tropsch off-gas by a gas/liquid separator.

The Fischer-Tropsch off-gas may comprise gaseous hydrocarbons, nitrogen, unconverted methane, unconverted carbon monoxide, carbon dioxide, hydrogen and water. The gaseous hydrocarbons are suitably $C_1$-$C_5$ hydrocarbons, preferably $C_1$-$C_4$ hydrocarbons, more preferably $C_1$-$C_3$ hydrocarbons. These hydrocarbons, or mixtures thereof, are gaseous at temperatures of 5-30° C. (1 bar), especially at 20° C. (1 bar). Further, oxygenated compounds, e.g. methanol, dimethylether, may be present.

In most cases the Fischer-Tropsh off-gas will contain 10-40 vol % hydrogen, preferably 15-35 vol % hydrogen, 20-65 vol % CO, preferably 30-55 vol % CO, 10-50 vol % CO2, especially 15-45 vol % CO2, and 10-55 vol % N2, especially 15-50 vol % N2, calculated on the total volume of the gas mixture. Depending on the syngas feed and the Fischer-Tropsch conditions the composition of the Fischer-Tropsch off-gas can vary. Obviously, the total volume of the gas mixture is 100 vol %.

The present invention provides a method for producing a gas comprising at least 80 vol% carbon monoxide, calculated on the total volume of the gas, from a gas mixture comprising 5-50 vol % methane, 10-50 vol % carbon dioxide, 20-65 vol % carbon monoxide, 10-40 % vol% hydrogen and 10-55 vol % nitrogen, calculated on the total volume of the gas mixture, said method comprising, in sequence, the following steps:

(1) feeding a gas mixture through a column comprising an adsorbent bed, said gas mixture comprising 5-50 vol % methane, 10-50 vol % carbon dioxide, 20-65 vol % carbon monoxide, 10-40 vol % hydrogen and 10-55 vol % nitrogen, calculated on the total volume of the gas mixture, with upon commencement of said feeding, the bed and column being pre-saturated and pre-pressurized to a pressure in the range of 20 to 80 bar absolute (bar a), preferably 30 to 70 bar a, with pure hydrogen, or with a mixture of hydrogen and nitrogen, and
discharging effluent from the other end of said bed, and
continuing said feeding and said discharging until a carbon monoxide comprising gas has reached at least 45% of the length of the bed and has reached at most 80% of the length of the bed, calculated from the end of the bed at which the gas mixture is being fed; and (2) ceasing the feeding of the gas mixture comprising methane, carbon dioxide, carbon monoxide and hydrogen, and reducing the pressure in the column and the bed with about 5 to 10 bar a; and (3) rinsing the column and the adsorbent bed by feeding a gas comprising at least 95 vol % methane, or a gas mixture of methane and carbon dioxide, through the column and adsorbent bed,
the column and bed being at a pressure in the range of 15 to 75 bar a, preferably 25 to 65 bar a, more preferably 30 to 55 bar a, and
discharging effluent from the other end of said bed, and
continuing said feeding and said discharging until at least 60% of the carbon monoxide that was present in the bed at the commencement of this rinsing step is discharged from the other end of said bed; and (4) ceasing the feeding of a gas comprising at least 95 vol % methane, or a gas mixture of methane and carbon dioxide, and reducing the pressure of the column and adsorbent bed to a pressure in the range of 1 to 5 bar a; and (5) rinsing the column and adsorbent bed by feeding a mixture of hydrogen and nitrogen through the column and adsorbent bed
the column and bed being at a pressure in the range of 1 to 5 bar a, and (6) pressurizing the column and adsorbent bed to a pressure in the range of 15 to 75 bar a, preferably 25 to 65 bar a, more preferably 30 to 55 bar a by feeding a mixture of hydrogen and nitrogen.

In a preferred embodiment of the present invention repeated cycles of steps (1) to (6) are performed. Effluent from one step can be used as feeding gas in another step; this is especially advantageous when repeated cycles of steps (1) to (6) are performed.

The method may be performed using a single column comprising an adsorbent bed. Preferably several columns that comprise an adsorbent bed are used. When using more than one column, the columns are preferably connected in parallel. Preferably the repeated cycles of steps (1) to (6) are performed over each column. In a preferred embodiment at least one column is subjected to one step of the cycle while another column is subjected to another step of the cycle. The product of one column can be used in another column, for example for purge, pressurization or rinse. In one embodiment at least two columns comprising an adsorbent bed, preferably at least six columns comprising an adsorbent bed, are subjected to repeated cycles of steps (1) to (6). Preferably at most 20, more preferably at most 15, columns comprising an adsorbent bed are subjected to repeated cycles of steps (1) to (6).

The gas mixture comprising 5-50 vol % methane, 10-50 vol % carbon dioxide, 20-65 vol % carbon monoxide, 10-40 vol% hydrogen and 10-55 vol% nitrogen, calculated on the total volume of the gas mixture, preferably is a gaseous product from a Fischer-Tropsch reaction. In that case it may be referred to as Fischer-Tropsch off-gas. Fischer-Tropsch off-gas is typically produced by a Fischer-Tropsch hydrocarbon synthesis process comprising the steps of:

i) conversion of a (gaseous) hydrocarbonaceous feed to obtain synthesis gas (syngas);
ii) catalytic conversion of the synthesis gas obtained in step i) using a Fischer-Tropsch catalyst into a Fischer-Tropsch product; and
iii) separating the Fischer-Tropsch product of step ii) into at least one hydrocarbon product stream and a Fischer-Tropsch off-gas.

The off-gas obtained in step iii) may comprise gaseous hydrocarbons, nitrogen, unconverted methane, unconverted carbon monoxide, carbon dioxide, hydrogen and water. The gaseous hydrocarbons are suitably $C_1$-$C_5$ hydrocarbons, preferably $C_1$-$C_4$ hydrocarbons, more preferably $C_1$-$C_3$ hydrocarbons. These hydrocarbons, or mixtures thereof, are gaseous at temperatures of 5-30° C. (1 bar), especially at 20° C. (1 bar). Further, oxygenated compounds, e.g. methanol, dimethylether, may be present.

The gas mixture comprising 5-50 vol % methane, 10-50 vol % carbon dioxide, 20-65 vol % carbon monoxide, 10-40 vol % hydrogen and 10-55 vol% nitrogen, calculated on the total volume of the gas mixture, preferably comprises less than 10 volume %, more preferably less than 5 volume %, of hydrocarbons having 6 or more carbon atoms. More preferably the gas mixture comprises less than 10 volume %, more preferably less than 5 volume %, of hydrocarbons having 5 or more carbon atoms. Even more preferably the gas mixture comprises less than 10 volume %, more preferably less than 5 volume %, of hydrocarbons having 4 or more carbon atoms. In one embodiment hydrocarbons having 3 or more carbon atoms are removed from a Fischer-Tropsch off-gas, for example using a scrubber, before it is subjected to the method of the present invention. The gas mixture comprising 5-50 vol % methane, 10-50 vol % carbon dioxide, 20-65 vol % carbon monoxide, 10-40 vol% hydrogen and 10-55 vol % nitrogen, calculated on the total volume of the gas mixture, may comprise ethane. In a preferred embodiment the amount of ethane is less than 5 wt %, more preferably less than 2 wt %, and even more preferably less than 1 wt %, calculated on the total weight of the gas mixture.

The column comprising an adsorbent bed may be made of metal, preferably stainless steel. The adsorbent bed may comprise, for example, alumina, a carbon molecular sieve, silicalite, activated carbon, a zeolite, or mixtures thereof. Preferably the adsorbent bed comprises activated carbon and/or zeolite. In another preferred embodiment the adsorbent bed comprises activated carbon and/or silicalite. When alumina is used, it is preferably combined with a carbon molecular sieve, activated carbon silicalite and/or zeolite. If zeolite is used, it may for example be ZSM-5A and/or ZSM-13X. If silicalite is used, preferably a silicalite with a high silica to alumina molar ratio (SAR) is used. Activated carbon, silicalite and zeolite hardly adsorb nitrogen and hydrogen, but do adsorb carbon monoxide, methane, and carbon dioxide. Activated carbon, silicalite and zeolite are preferential adsorbers for methane and carbon dioxide as compared to carbon monoxide.

The adsorbent bed and column are already pre-saturated and pre-pressurized with hydrogen or with a mixture of hydrogen and nitrogen upon commencement of feeding the gas mixture comprising methane, carbon dioxide, carbon monoxide and hydrogen in step (1). The bed and column may be saturated and pressurized with pure hydrogen. Pure hydrogen comprises more than 90 volume %, preferably more than 95 vol %, and more preferably more than 99 vol % of hydrogen. The bed and column may be saturated and pressurized with a mixture of hydrogen and nitrogen. The mixture of hydrogen and nitrogen preferably comprises hydrogen in a range of between 60 to 95 vol %, and nitrogen in a range of between 5 to 40 vol %. The mixture of hydrogen and nitrogen preferably comprises less than 10 vol %, more preferably less than 5 vol %, even more preferably less than 1 vol % of gasses other than hydrogen and nitrogen. For example, the bed and column may be saturated and pressurized with a product hydrogen and nitrogen comprising gas from step (1) of an earlier cycle.

In step (1), effluent is discharged from the other end of the adsorbent bed. The adsorbent bed will adsorb methane, carbon dioxide and carbon monoxide. The effluent will mainly comprise hydrogen and nitrogen. A part of this effluent can be used to pressurize a column and adsorbent bed at the start of a cycle or in step (6). Another part of this effluent can be used in rinsing step (5). Another part can be sent as feed to a Fischer-Tropsch reaction, even though it comprises nitrogen. The pressure of the effluent gas will be about the same as the pressure in the column and the adsorbent bed and will thus be in the range of 20 to 80 bar absolute (bar a), preferably 30 to 70 bar a.

In step (1), the feeding of the gas mixture and the discharging of the effluent are continued until a carbon monoxide comprising gas has reached at least 45% of the length of the bed, preferably at least 50%, more preferably at least 60%, and has reached at most 80% of the length of the bed, preferably at most 70%, calculated from the end of the bed at which the gas mixture is being fed. In a preferred embodiment, the feeding and discharging is ceased when the adsorption capacity of the adsorbent bed towards carbon monoxide is reduced by 50% to 80%, preferably 60% to 70% from its adsorption capacity towards carbon monoxide when commencing the feeding of the gas mixture.

The progress of a carbon monoxide comprising gas through the bed can be monitored. This may, for example, be performed by analyzing gas samples of the effluent and/or gas samples from the column and adsorbent bed. The progress of a carbon monoxide comprising gas through the bed may additionally or alternatively be monitored by determining the temperature along the length of the bed, e.g. by using thermocouples placed along the length of the bed. At the front of the carbon monoxide comprising gas the temperature is increased as compared to the part of the bed that has not yet been reached by the carbon monoxide comprising gas. At the front of the carbon monoxide comprising gas the temperature is also increased as compared to the part of the bed where the carbon monoxide has already been adsorbed in the adsorbent bed.

In step (2), ceasing the feeding of the gas mixture is performed by stopping the flow of gas to the column comprising an adsorbent bed. When the feeding and discharging is stopped, some hydrogen and nitrogen will remain in the column containing an adsorbent bed. Upon ceasing the feeding of the gas mixture, the pressure in the column and adsorbent bed is reduced with about 5 to 10 bar a. The pressure reduction in the column and adsorbent bed suffices to let most of the effluent, which comprises hydrogen and nitrogen, leave. The effluent leaves the column and bed at the same end from which effluent was discharged in step (1).

In step (3), a gas comprising at least 95 vol % methane, or a gas mixture of methane and carbon dioxide, is fed to the column comprising an adsorbent bed. In step (3) preferably a gas comprising at least 99 vol % methane, or a gas mixture of methane and carbon dioxide, is fed to the column comprising an adsorbent bed. In step (3), the gas is fed to the same end of the bed at which a gas mixture was fed in step (1).

The gas comprising at least 95 vol % methane, preferably at least 99 vol % methane, may, for example, be pure methane or treated natural gas. Treated natural gas is natural gas from which contaminants like water and sulfur have been removed. The gas comprising at least 95 vol % methane, preferably at least 99 vol % methane, may, for example, have the same composition as the hydrocarbonaceous feed that is converted into syngas for the Fischer-Tropsch reaction.

The mixture of methane and carbon dioxide preferably comprises methane in a range of between 30 to 40 vol %, and carbon dioxide in a range of between 60 to 70 vol %. The mixture of methane and carbon dioxide preferably comprises less than 10 vol %, more preferably less than 5 vol %, even more preferably less than 1 vol % of gasses other than methane and carbon dioxide. For example, the bed and column may be fed with a product methane and carbon dioxide comprising gas from step (4) of an earlier cycle. In that case the product methane and carbon dioxide comprising gas from step (4) of an earlier cycle is pressurized before it is used as feeding gas in step (3).

In step (3), effluent is discharged from the other end of the adsorbent bed. The adsorbent bed will adsorb even more carbon dioxide and methane. The effluent will mainly comprise carbon monoxide. Preferably the effluent comprises at least 80 vol %, more preferably at least 90 vol %, even more preferably at least 95 vol %, still more preferably at least 99 vol % carbon monoxide, calculated on the total volume of the effluent. The pressure of the effluent gas will be about the same as the pressure in the column and the adsorbent bed and will thus be in the range of 15 to 75 bar absolute (bar a), preferably 25 to 65 bar a, more preferably 30 to 55 bar a. The carbon monoxide product stream, or a part thereof, can be used as feed for a Fischer-Tropsch reaction. It can, for example, be a recycle stream in a Fischer-Tropsch process. This is very advantageous as it makes it possible to convert most of the carbon atoms of the hydrocarbonaceous feed stock to the desired $C_5+$ hydrocarbons.

In one embodiment of the method of the present invention, an optionally scrubbed Fischer-Tropsch off-gas is used in step (1), and at least a part of the effluent of step (3) is sent as a recycle stream to the Fischer-Tropsch reactor that produced the off-gas.

In another embodiment, an optionally scrubbed Fischer-Tropsch off-gas from a first Fischer-Tropsch reactor is used in step (1), and at least a part of the effluent of step (3) is sent as a feed stream to a second Fischer-Tropsch reactor.

In a further embodiment at least a part of the effluent of step (3) is sent as a recycle stream to the Fischer-Tropsch reactor that produced the off-gas, and at least a part of the effluent of step (3) is sent as a feed stream to a second Fischer-Tropsch reactor.

In step (3), the feeding of a gas comprising at least 95 vol % methane, or a gas mixture of methane and carbon dioxide, and the discharging of the effluent are continued until at least 60%, preferably at least 70%, more preferably at least 80%, even more preferably at least 90%, still more preferably at least 95% of the carbon monoxide that was present in the adsorbent bed at the commencement of this rinsing step is discharged from the other end of the bed. The methane, or methane and carbon dioxide, in the feed will replace carbon monoxide in the adsorbent bed. In a preferred embodiment, the feeding and discharging is ceased when the adsorption capacity of the adsorbent bed towards methane, or towards methane and carbon dioxide, is nil or almost nothing.

The progress of a methane comprising gas through the bed can be monitored, e.g. by analyzing gas samples of the effluent and/or gas samples from the column and adsorbent bed. The progress of a methane comprising gas through the bed may additionally or alternatively be monitored by determining the temperature along the length of the bed, e.g. by using thermocouples placed along the length of the bed. At the front of the methane comprising gas the temperature is increased as compared to the part of the bed that has not yet been reached by the methane comprising gas. At the front of the methane comprising gas the temperature is also increased as compared to the part of the bed where the methane has already replaced carbon monoxide in the adsorbent bed.

In step (4), the feeding of a gas comprising at least 95 vol % methane, or a gas mixture of methane and carbon dioxide, is ceased. The pressure of the column and adsorbent bed is reduced to a pressure in the range of 1 to 5 bar a. During step (4) methane and carbon dioxide leave the column and bed at the same end at which in step (3) methane, or a mixture of methane and carbon dioxide, was fed to the column and bed. A part of this effluent can be pressurized and then used in step (3) of a next cycle. Another part of this effluent can be sent to a fuel pool, to a gasifier, or to a steam methane reformer (SMR). During step (4) almost all methane and carbon dioxide leave the column and bed.

In step (5), the column and adsorbent bed are rinsed by feeding a mixture of hydrogen and nitrogen through the column and adsorbent bed. The mixture of hydrogen and nitrogen is fed to the same end of the column and bed from which effluent was discharged in step (1). During step (5) residual methane and carbon dioxide leave the column and bed at the same end at which in step (1) a gas mixture was fed to the column and bed. In a preferred embodiment, the mixture of hydrogen and nitrogen used in step (5) is a part of the effluent from step (2), and may optionally also comprise a part of the effluent from step (1). The gas mixture fed to the column and bed rinses the bed from methane and carbon dioxide. The pressure of the effluent gas will be about the same as the pressure in the column and the adsorbent bed and will thus be in the range of 1 to 5 bar a. The effluent can be sent to a fuel pool.

In a preferred embodiment, the column and adsorbent bed are rinsed in step (5) by feeding a gas comprising at least 95 vol % nitrogen, preferably at least 99 vol % nitrogen, through the column and adsorbent bed, followed by feeding a mixture of hydrogen and nitrogen through the column and adsorbent bed, whereby the column and bed are at a pressure in the range of 1 to 5 bar a. The gas comprising at least 95 vol % nitrogen, preferably at least 99 vol % nitrogen, may be the product of an air separation unit (ASU). The mixture of hydrogen and nitrogen preferably is a part of the effluent from step (2), and may optionally also comprise a part of the effluent from step (1). The gas comprising at least 95 vol % nitrogen, and in a subsequent step the mixture of hydrogen and nitrogen, are fed to the same end of the column and bed from which effluent was discharged in step (1). When the gas comprising at least 95 vol % nitrogen is fed to the column and bed, a part of the residual methane and carbon dioxide leave the column and bed at the same end at which in step (1) a gas mixture was fed to the column and bed. This effluent can be sent to a fuel pool. When in a subsequent step the mixture of hydrogen and nitrogen is fed to the column and bed, further residual methane and carbon dioxide leave the column and bed at the same end at which in step (1) a gas mixture was fed to the column and bed. This effluent can be sent to a fuel pool.

In step (6) the column and adsorbent bed are pressurized to a pressure in the range of 15 to 75 bar a, preferably 25 to 65 bar a, more preferably 30 to 55 bar a by feeding a mixture of hydrogen and nitrogen. The mixture used may be or may comprise a part of the product hydrogen and nitrogen from step (2), and may optionally also comprise a part of the product hydrogen and nitrogen from step (1). The mixture of hydrogen and nitrogen preferably comprises hydrogen in a range of between 60 to 95 vol %, and nitrogen in a range of between 5 to 40 vol %. The mixture of hydrogen and nitrogen preferably comprises less than 10 vol %, more preferably less than 5 vol %, even more preferably less than 1 vol % of gases other than hydrogen and nitrogen.

In a preferred embodiment, the invention provides a method for producing for producing a gas comprising at least 80 vol % carbon monoxide from a gas mixture comprising 5-50 vol % methane, 10-50 vol % carbon dioxide, 20-65 vol % carbon monoxide, 10-40 vol % hydrogen and 10-55 vol % nitrogen, calculated on the total volume of the gas mixture, said method comprising, in sequence, the following steps:
(1) feeding a gas mixture through a column comprising an adsorbent bed, said gas mixture comprising 5-50 vol % methane, 10-50 vol % carbon dioxide, 20-65 vol % carbon monoxide, 10-40 vol % hydrogen and 10-55 vol % nitrogen, calculated on the total volume of the gas mixture, with upon commencement of said feeding, the bed and column being pre-saturated and pre-pressurized to a pressure in the range of 20 to 80 bar absolute (bar a), preferably 30 to 70 bar a, with pure hydrogen, or with a mixture of hydrogen and nitrogen, and discharging effluent from the other end of said bed, and continuing said feeding and said discharging until a carbon monoxide comprising gas has reached at least 45% of the length of the bed and has reached at most 80% of the length of the bed, calculated from the end of the bed at which the gas mixture is being fed; and (2) ceasing the feeding of the gas mixture comprising methane, carbon dioxide, carbon monoxide and hydrogen, and reducing the pressure in the column and the bed with about 5 to 10 bar a; and (3) rinsing the column and the adsorbent bed by feeding a gas comprising at least 95 vol % methane, or a gas mixture of methane and carbon dioxide, through the column and adsorbent bed, the column and bed being at a pressure in the range of 15 to 75 bar a, preferably 25 to 65 bar a, more preferably 30 to 55 bar a, and discharging effluent from the other end of said bed, and continuing said feeding and said discharging until at least 60% of the carbon monoxide that was present in the bed at the commencement of this rinsing step is discharged from the other end of said bed; and (4) ceasing the feeding of a gas comprising at least 95 vol % methane, or a gas mixture of methane and carbon dioxide, and reducing the pressure of the column and adsorbent bed to a pressure in the range of 1 to 5 bar a; and (5) rinsing the column and adsorbent bed by feeding a mixture of hydrogen and nitrogen through the column and adsorbent bed the column and bed being at a pressure in the range of 1 to 5 bar a, and (6) pressurizing the column and adsorbent bed to a pressure in the range of 15 to 75 bar a, preferably 25 to 65 bar a, more preferably 30 to 55 bar a by feeding a mixture of hydrogen and nitrogen, said method further comprising, in sequence, the following steps:

(A) feeding the effluent of step (1) through a column comprising an adsorbent bed, with upon commencement of said feeding, the bed and column being pre-saturated and pre-pressurized to a pressure in the range of 20 to 80 bar absolute (bar a), preferably 30 to 70 bar a, with pure hydrogen and discharging effluent from the other end of said bed, and continuing said feeding and said discharging until a nitrogen comprising gas has reached at least 45% of the length of the bed and has reached at most 80% of the length of the bed, calculated from the end of the bed at which the gas mixture is being fed; and (B) ceasing the feeding of the effluent of step (1), and reducing the pressure in the column and the bed with about 2 to 5 bar a; and (C) further reducing the pressure in the column and the bed with about 2 to 5 bar a; and (D) reducing the pressure of the column and adsorbent bed to a pressure in the range of 1 to 5 bar a; and (E) rinsing the column and adsorbent bed by feeding pure hydrogen through the column and adsorbent bed the column and bed being at a pressure in the range of 1 to 5 bar a, and (F) pressurizing the column and adsorbent bed to a pressure in the range of 5 to 50 bar a, preferably 10 to 45 bar a, more preferably 20 to 40 bar a by feeding hydrogen, and (G) further pressurizing the column and adsorbent bed to a pressure in the range of 15 to 75 bar a, preferably 25 to 65 bar a, more preferably 30 to 55 bar a by feeding hydrogen.

In this preferred embodiment, besides a gas comprising at least 80 vol % carbon monoxide, calculated on the total volume of this carbon monoxide comprising gas, preferably also a gas comprising at least 80 vol % hydrogen, calculated on the total volume of this hydrogen comprising gas, is produced. The gas comprising at least 80 vol % carbon monoxide is effluent from step (3). The gas preferably comprising at least 80 vol % hydrogen is obtained in steps (A), (B), (C), (F) and (G).

One advantage of this preferred embodiment of the present invention is that the method is suitable to obtain a pure carbon monoxide stream from Fischer-Tropsch off-gas in step (3). This pure carbon monoxide stream can be recycled to the Fischer-Tropsch reactor. This makes it possible to convert most of the carbon atoms of the hydrocarbonaceous feed stock to the desired $C_5+$ hydrocarbons.

Another advantage of this preferred embodiment of the present invention is that the method is suitable to obtain a pure hydrogen stream from Fischer-Tropsch off-gas in step (A). This pure hydrogen stream can be recycled to the Fischer-Tropsch reactor and/or it can be used in another process that requires hydrogen, for example when adjusting the $H_2/CO$ ratio of the feed to a second Fischer-Tropsch reactor.

As the process of this preferred embodiment of the present invention allows a recycle of both carbon monoxide and hydrogen from a Fischer-Tropsch off-gas, it is a suitable method for recycling unconverted syngas.

As described above, steps (1) to (6) may be performed using a single column comprising an adsorbent bed. As described above, preferably repeated cycles of steps (1) to (6) are performed.

In a preferred embodiment of the present invention repeated cycles of steps (A) to (G) are performed. Effluent from one step can be used as feeding gas in another step; this is especially advantageous when repeated cycles of steps (A) to (G) are performed.

Steps (A) to (G) may be performed using a single column comprising an adsorbent bed. Preferably several columns that comprise an adsorbent bed are used. When using more than one column, the columns are preferably connected in parallel. Preferably the repeated cycles of steps (A) to (G) are performed over each column. In a preferred embodiment at least one column is subjected to one step of the cycle while another column is subjected to another step of the cycle. The product of one column can be used in another column, for example for purge, pressurization or rinse. In one embodiment at least two columns comprising an adsorbent bed, preferably at least five columns comprising an adsorbent bed, are subjected to repeated cycles of steps (A) to (G). Preferably at most 20, more preferably at most 15, columns comprising an adsorbent bed are subjected to repeated cycles of steps (A) to (G).

The feed gas for step (A) is at least a part of the effluent of step (1).

The feed gas for step (A) preferably comprises 10 to 40 volume % nitrogen and 60 to 90 volume % hydrogen. More preferably the feed gas for step (A) comprises 15 to 35 volume % nitrogen and 65 to 85 volume % hydrogen.

The column comprising an adsorbent bed may be made of metal, preferably stainless steel. The adsorbent bed may comprise, for example, alumina, a carbon molecular sieve, silicalite, activated carbon, a zeolite, or mixtures thereof. Preferably the adsorbent bed comprises a zeolite. When alumina is used, it is combined with a zeolite. The zeolite may for example be ZSM-5A and/or ZSM-13X and/or a LiX zeolite. Zeolite is a preferential adsorber for nitrogen as compared to hydrogen.

The adsorbent bed and column are already pre-saturated and pre-pressurized with hydrogen upon commencement of feeding the effluent of step (1) in step (A). The bed and column may be saturated and pressurized with pure hydrogen. Pure hydrogen comprises more than 90 volume %, preferably more than 95 vol %, and more preferably more than 99 vol % of hydrogen. The bed and column may be saturated and pressurized with a product hydrogen comprising gas from step (A) of an earlier cycle.

In step (A), effluent is discharged from the other end of the adsorbent bed. The adsorbent bed will adsorb nitrogen. The effluent will mainly comprise hydrogen. A part of this effluent can be used to pressurize a column and adsorbent bed at the start of a cycle or in step (G). Another part can be sent as feed to a Fischer-Tropsch reaction. The pressure of the effluent gas will be about the same as the pressure in the column and the adsorbent bed and will thus be in the range of 20 to 80 bar absolute (bar a), preferably 30 to 70 bar a.

In step (A), the feeding of the gas mixture and the discharging of the effluent are continued until a nitrogen comprising gas has reached at least 45% of the length of the bed, preferably at least 50%, more preferably at least 60%, and has reached at most 80% of the length of the bed, preferably at most 70%, calculated from the end of the bed at which the gas mixture is being fed. In a preferred embodiment, the feeding and discharging is ceased when the adsorption capacity of the adsorbent bed towards nitrogen is reduced by 50% to 80%, preferably 60% to 70% from its adsorption capacity towards nitrogen when commencing the feeding of the gas mixture. The progress of a nitrogen comprising gas through the bed can be monitored, e.g. by analyzing gas samples of the effluent and/or gas samples from the column and adsorbent bed. The progress of a nitrogen comprising gas through the bed may additionally or alternatively be monitored by determining the temperature along the length of the bed, e.g. by using thermocouples placed along the length of the bed. At the front of the nitrogen comprising gas the temperature is increased as compared to the part of the bed that has not yet been reached by the nitrogen comprising gas. At the front of the nitrogen comprising gas the temperature is also increased as compared to the part of the bed where nitrogen has already been adsorbed.

In step (B), ceasing the feeding of the gas mixture is performed by stopping the flow of gas to the column comprising an adsorbent bed. When the feeding and discharging is stopped, some hydrogen and nitrogen will remain in the column containing an adsorbent bed. Upon ceasing the feeding of the gas mixture, the pressure in the column and adsorbent bed is preferably reduced with in total about 5 to 10 bar a in steps (B) and (C). Most preferably steps (B) and (C) are performed as separate steps. It is also possible to combine steps (B) and (C) and reduce the pressure in the column and adsorbent bed with in total about 5 to 10 bar a in a single step. When steps (B) and (C) are preformed separately, the pressure in the column and bed is reduced in step (B) with about 2 to 5 bar a, and is further reduced in step (C) with another 2 to 5 bar a. The pressure reduction in the column and adsorbent bed suffices to let most of the effluent, which comprises hydrogen, leave. During steps (B) and (C) the effluent leaves the column and bed at the same end from which effluent was discharged in step (A).

In step (D), the pressure of the column and adsorbent bed is reduced to a pressure in the range of 1 to 5 bar a. During step (D) hydrogen and nitrogen leave the column and bed at the same end at which in step (A) effluent of step (1) was fed to the column and bed. The effluent can be sent to a fuel pool. During step (D) almost all hydrogen and nitrogen leave the column and bed.

In step (E), the column and adsorbent bed are rinsed by feeding hydrogen through the column and adsorbent bed. The hydrogen is fed to the same end of the column and bed from which effluent was discharged in step (A). During step (E) residual nitrogen leaves the column and bed at the same end at which in step (A) an effluent from step (1) was fed to the column and bed. In a preferred embodiment, the hydrogen used in step (E) is a part of the effluent from step (C), and may optionally also comprise a part of the effluent from step (B) and/or (A). The hydrogen fed to the column and bed rinses the bed from nitrogen. The pressure of the effluent gas will be about the same as the pressure in the column and the adsorbent bed and will thus be in the range of 1 to 5 bar a. The effluent can be sent to a fuel pool. Additionally or alternatively at least a part of the effluent of step (E) can be used as a feeding gas in step (5).

In steps (F) and (G) the column and adsorbent bed are pressurized to a pressure in the range of 15 to 75 bar a, preferably 25 to 65 bar a, more preferably 30 to 55 bar a by feeding hydrogen. In step (F), the hydrogen used may be or may comprise a part of the product hydrogen from step (B), and may optionally also comprise a part of the product hydrogen from step (A). In step (G), the hydrogen preferably is a part of the product hydrogen from step (A). Most preferably steps (F) and (G) are performed as separate steps. When steps (F) and (G) are preformed separately, the column and bed are pressurized in step (F) to a pressure in the range of 5 to 50 bar a, preferably 10 to 45 bar a, more preferably 20 to 40 bar a, and is further pressurized in step (G) to a pressure in the range of 15 to 75 bar a, preferably 25 to 65 bar a, more preferably 30 to 55 bar a. It is also possible to combine steps (F) and (G) and pressurize the column and adsorbent bed to a pressure in the range of 15 to 75 bar a, preferably 25 to 65 bar a, more preferably 30 to 55 bar a by feeding hydrogen in a single step using hydrogen from step (A) and optionally also hydrogen from step (B).

In a another preferred embodiment, the invention provides a method for producing a gas comprising at least 80 vol % carbon monoxide, calculated on the total volume of this carbon monoxide comprising gas from a gas mixture comprising 5-50 vol % methane, 10-50 vol % carbon dioxide, 20-65 vol % carbon monoxide, 10-40 vol % hydrogen and 10-55 vol % nitrogen, calculated on the total volume of the gas mixture, said method comprising, in sequence, the following steps:

(1) feeding a gas mixture through a column comprising an adsorbent bed, said gas mixture comprising 5-50 vol % methane, 10-50 vol % carbon dioxide, 20-65 vol % carbon monoxide, 10-40 vol % hydrogen and 10-55 vol % nitrogen, calculated on the total volume of the gas mixture,
with upon commencement of said feeding, the bed and column being pre-saturated and pre-pressurized to a pressure in the range of 20 to 80 bar absolute (bar a), preferably 30 to 70 bar a, with pure hydrogen, or with a mixture of hydrogen and nitrogen, and
discharging effluent from the other end of said bed, and continuing said feeding and said discharging until a carbon monoxide comprising gas has reached at least 45% of the length of the bed and has reached at most 80% of the length of the bed, calculated from the end of the bed at which the gas mixture is being fed; and (2) ceasing the feeding of the gas mixture comprising methane, carbon dioxide, carbon monoxide and hydrogen, and reducing the pressure in the column and the bed with about 5 to 10 bar a; and
(3) rinsing the column and the adsorbent bed by feeding a gas comprising at least 95 vol % methane, or a gas mixture of methane and carbon dioxide, through the column and adsorbent bed,
  the column and bed being at a pressure in the range of 15 to 75 bar a, preferably 25 to 65 bar a, more preferably 30 to 55 bar a, and
  discharging effluent from the other end of said bed, and continuing said feeding and said discharging until at least 60% of the carbon monoxide that was present in the bed at the commencement of this rinsing step is discharged from the other end of said bed; and
(4) ceasing the feeding of a gas comprising at least 95 vol % methane, or a gas mixture of methane and carbon dioxide, and reducing the pressure of the column and adsorbent bed to a pressure in the range of 1 to 5 bar a; and
(5) rinsing the column and adsorbent bed by feeding a mixture of hydrogen and nitrogen through the column and adsorbent bed
  the column and bed being at a pressure in the range of 1 to 5 bar a, and
(6) pressurizing the column and adsorbent bed to a pressure in the range of 15 to 75 bar a, preferably 25 to 65 bar a, more preferably 30 to 55 bar a by feeding a mixture of hydrogen and nitrogen, said method further comprising, in sequence, the following steps:
(I) sending at least a part of the discharged effluent of step (1) as feed to a membrane unit,
(II) optionally sending at least a part of the discharged effluent of step (3) as sweep gas to the membrane unit,
(III) optionally sending at least a part of the retentate of the membrane unit as feed to step (5),
(IV) sending at least a part of the permeate of the membrane unit as feed to a Fischer-Tropsch reaction.

In this preferred embodiment of the present invention a gas stream comprising hydrogen and carbon monoxide is produced which may be used as feed for a Fischer-Tropsch reaction. The produced gas comprising at least 80% carbon monoxide, which is effluent of step (3), may be partly or completely used to produce the gas stream comprising hydrogen and carbon monoxide.

In a preferred embodiment steps (II) and (III) are performed.

Steps (I) to (IV) and steps (A) to (G) as described above preferably are not combined. The process of the present invention preferably has either additional steps (A) to (G) or additional steps (I) to (IV).

The membrane unit that can be used can comprise a polymeric membrane or a ceramic membrane, preferably a polymeric membrane, most preferably a polyimide membrane. Such membranes are commercially available.

Discharged effluent of step (1) comprises nitrogen and hydrogen and is sent as feed to a membrane unit. Also a sweep gas is sent to the membrane unit. The sweep gas preferably comprises carbon monoxide and may be discharged effluent of step (3).

In the membrane unit, feed comprising nitrogen and hydrogen is sent to one side of the membrane and sweep gas comprising carbon monoxide is sent to the other side of the membrane. The feed comprising nitrogen and hydrogen which is sent as feed to one side of the membrane preferably is at a higher pressure as compared to the sweep gas comprising carbon monoxide which is sent to the other side of the membrane. The feed may, for example, be at a pressure in the range of from 30 to 70 bar a.

In the membrane unit, hydrogen flows through the membrane. Preferably nitrogen and carbon monoxide do not or hardly flow through the membrane. Hydrogen present in the feed to the membrane unit becomes part of the permeate. The permeate of the membrane unit comprises carbon monoxide and hydrogen. Permeate may be sent as feed to a Fischer-Tropsch reaction. The rutentate of the membrane unit comprises nitrogen. Rutentate may be sent as feed to step (5).

Some embodiments of the method according to the invention will be illustrated below with reference to the attached figures. It is noted that the present invention should not be considered limited thereto or thereby.

Figure 1A:
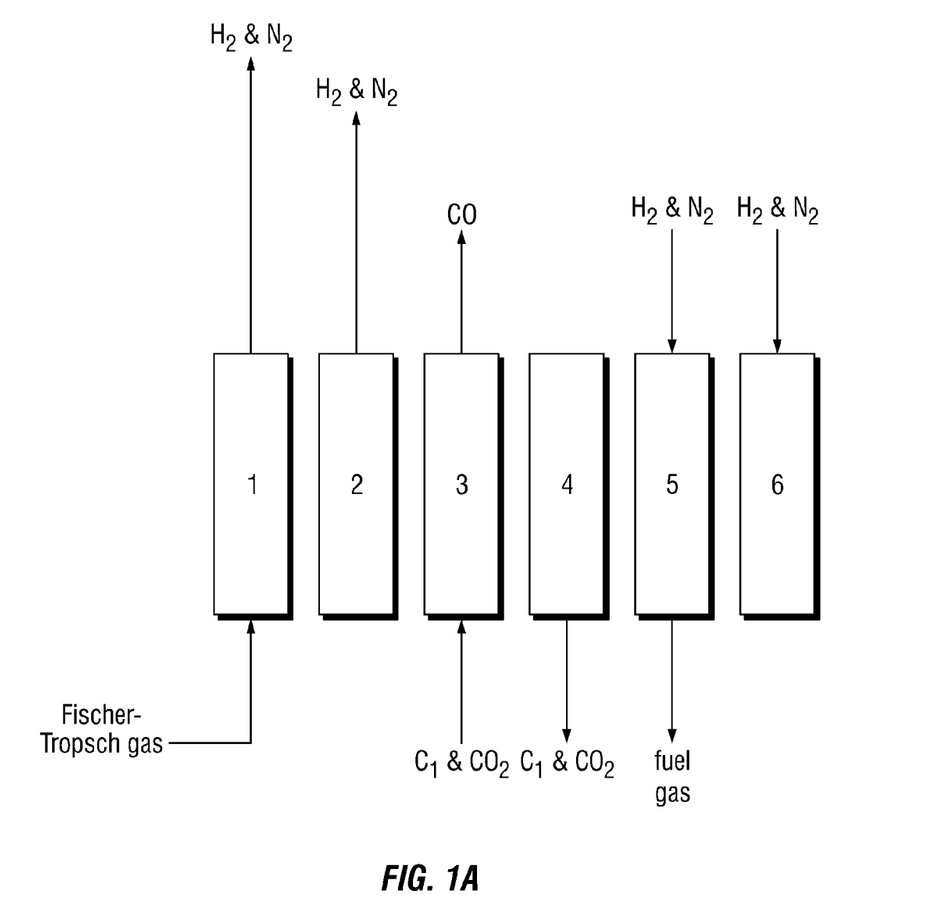
FIG. 1A shows an overview of the process steps of a method according to the invention.

FIG. 1A illustrates an overview of the process steps of a method according to the invention. The column comprising an adsorbent bed is depicted six times; each time it shows a step of the method according to the invention. In step (1) Fischer-Tropsch off-gas is fed to the column and bed and a mixture of hydrogen and nitrogen is discharged. During step (1) the pressure in the column and bed is high. In step (2) the pressure is reduced by 5 to 10 bar a, and a remainder of hydrogen and nitrogen is discharged. In step (3) the column and bed are rinsed by feeding them with a mixture of methane and carbon dioxide and discharging carbon monoxide. The carbon monoxide stream can be sent as feed to a Fischer-Tropsch reaction. In step (4) the pressure in the column and bed is reduced to 1 to 5 bar a, and methane and carbon dioxide are discharged. In step (5) a mixture of hydrogen and nitrogen is fed to the column and bed and the effluent may be sent to the fuel pool. In step (6) the column and bed are pressurized to a high pressure again using a mixture of hydrogen and nitrogen.

Figure 1B:
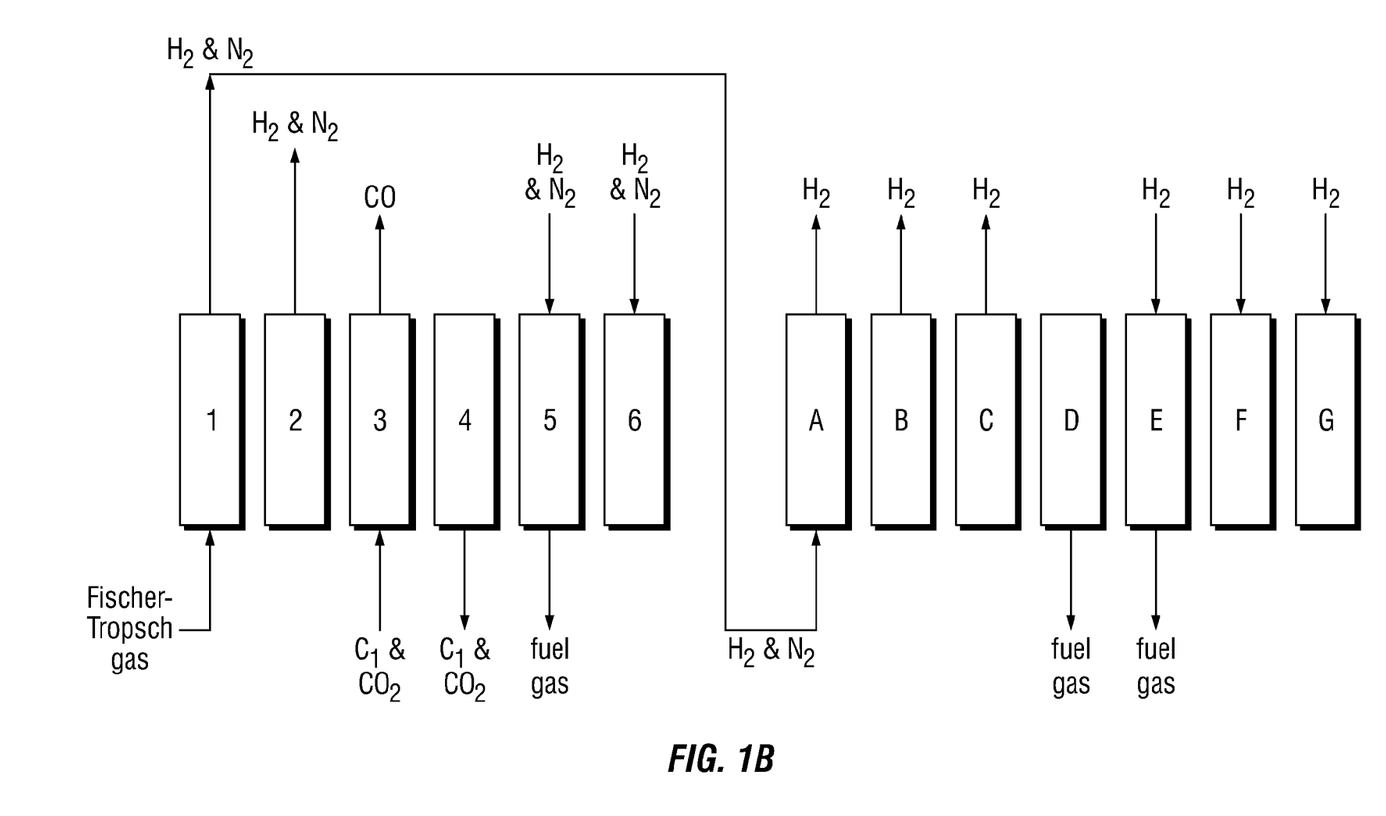
FIG. 1B shows an overview of the process steps of a preferred embodiment of the method of the present invention.

FIG. 1B shows an overview of the process steps of a preferred embodiment of the method of the present invention. One column comprising an adsorbent bed is depicted six times; each time it shows a step of steps (1) to (6) according to the invention. Another column comprising an adsorbent bed is depicted seven times; each time it shows a step of steps (A) to (G) according to the invention. In step (1) Fischer-Tropsch off-gas is fed to the column and bed and a mixture of hydrogen and nitrogen is discharged. During step (1) the pressure in the column and bed is high. In step (2) the pressure is reduced by 5 to 10 bar a, and a remainder of hydrogen and nitrogen is discharged. In step (3) the column and bed are rinsed by feeding them with a mixture of methane and carbon dioxide and discharging carbon monoxide. The carbon monoxide stream can be sent as feed to a Fischer-Tropsch reaction. In step (4) the pressure in the column and bed is reduced to 1 to 5 bar a, and methane and carbon dioxide are discharged. In step (5) a mixture of hydrogen and nitrogen is fed to the column and bed and the effluent may be sent to the fuel pool. In step (6) the column and bed are pressurized to a high pressure again using a mixture of hydrogen and nitrogen. In step (A) effluent from step (1) is fed to the column and bed and hydrogen is discharged. During step (A) the pressure in the column and bed is high. In steps (B) and (C) the pressure is reduced in total by 5 to 10 bar a, and a remainder of hydrogen is discharged. In step (D) the pressure in the column and bed is reduced to 1 to 5 bar a, and hydrogen and nitrogen are discharged. In step (E) hydrogen is fed to the column and bed and the effluent may be sent to the fuel pool. In steps (F) and (G) the column and bed are pressurized to a high pressure again using hydrogen.

FIGS. 2 to 7 illustrate overviews of parts of Fischer-Tropsch process line-ups each indicating a place at which the method according to the invention can be applied.

Figure 2:
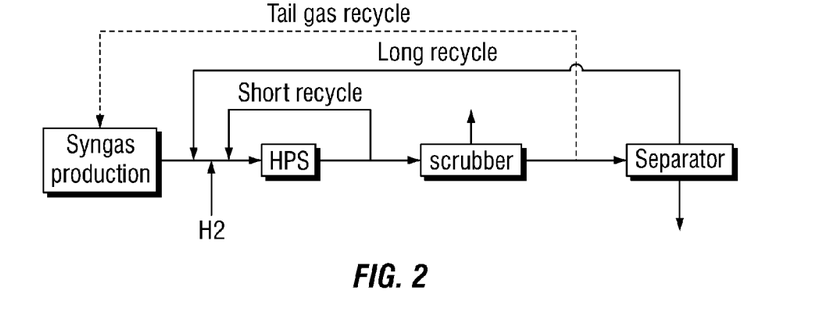
FIGS. 2 to 7 show parts of Fischer-Tropsch process line-ups each including an indication of the place in the process line-up at which the present invention may be applied.

FIG. 2 concerns a part of a process line-up comprising a single Fischer-Tropsch reactor HPS. The unit in which the method of the invention is performed is indicated with the word "Separator". In this line-up a scrubber is placed between the Fischer-Tropsch reactor HPS and the unit in which the method of the invention is performed (Separator) in order to remove hydrocarbons with 3 or more carbon atoms before the Fischer-Tropsch off-gas is fed to step (1) of the method of the present invention. Product gas comprising CO from step (3) is recycled from the Separator to the Fischer-Tropsch reactor HPS.

Figure 3:
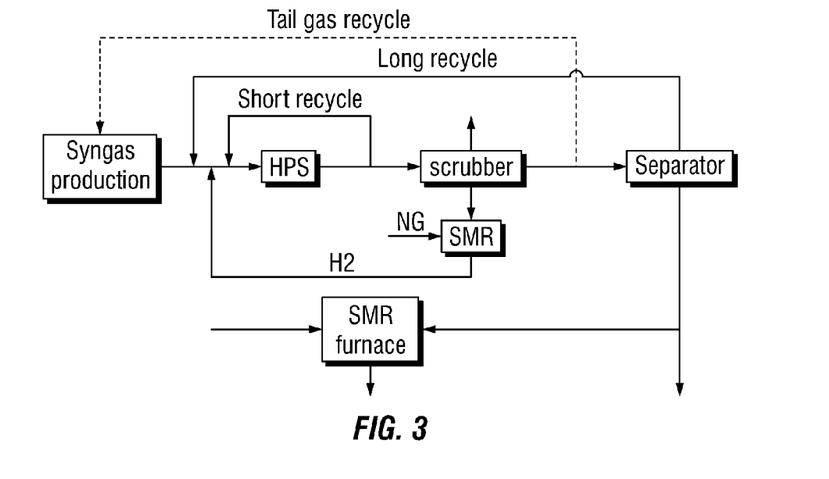

FIG. 3 concerns a part of a process line-up comprising a single Fischer-Tropsch reactor HPS. In this line-up a part of the scrubbed off-gas is sent to a steam methane reformer (SMR), and a part of the scrubbed off-gas is sent to the Separator, i.e. the unit for method according to the invention. Product gas comprising CO from step (3) is recycled from the Separator to the Fischer-Tropsch reactor HPS. A part of the effluent from step (4) and the effluent of step (5) are sent to the fuel pool.

Figure 4:
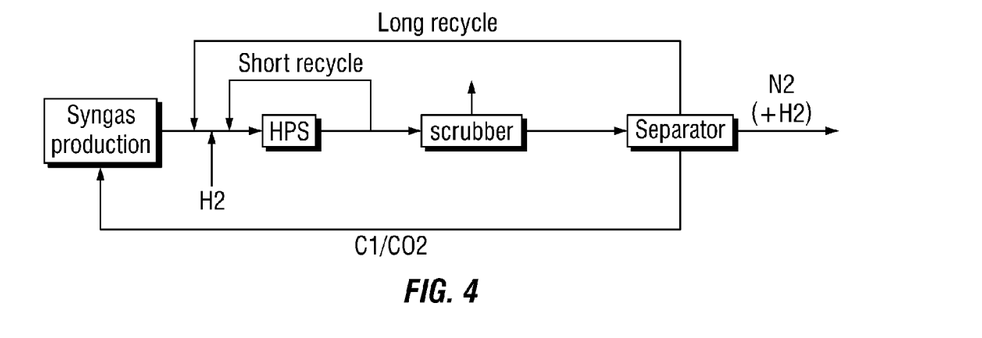

FIG. 4 concerns a part of a process line-up comprising a single Fischer-Tropsch reactor HPS. In this line-up a part of the effluent from step (4) is recycled to the syngas production unit.

Figure 5:
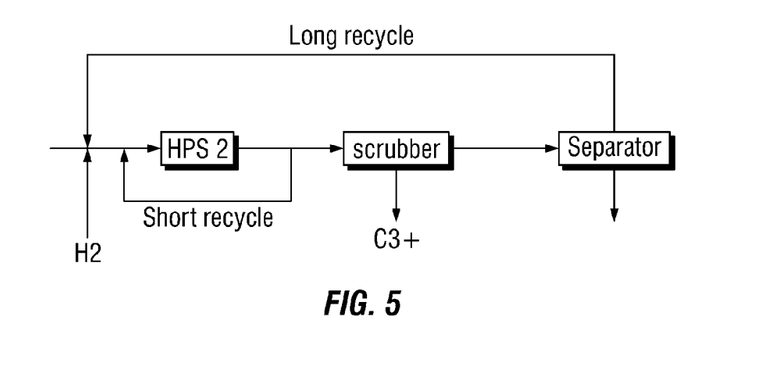

FIG. 5 concerns a part of a process line-up comprising a first Fischer-Tropsch reactor HPS 1 (not shown) and a second Fischer-Tropsch reactor HPS 2. The unit in which the method of the invention is performed is indicated with the word "Separator". In this line-up a scrubber is placed between the second Fischer-Tropsch reactor HPS 2 and the unit in which the method of the invention is performed (Separator) in order to remove hydrocarbons with 3 or more carbon atoms before the Fischer-Tropsch off-gas is fed to step (1) of the method of the present invention. Product gas comprising CO from step (3) is recycled from the Separator to the Fischer-Tropsch reactor HPS 2.

Figure 6:
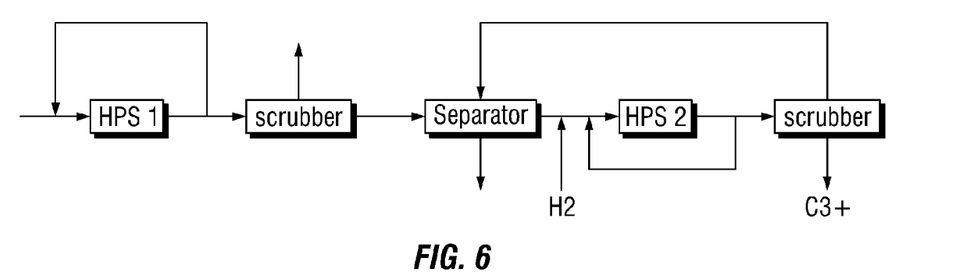

FIG. 6 concerns a part of a process line-up comprising a first Fischer-Tropsch reactor HPS 1 and a second Fischer-Tropsch reactor HPS 2. Scrubbed off-gas from Fischer-Tropsch reactor HPS 1 is sent to step (1) of the method according to the invention which takes place in the Separator. Product gas comprising CO from step (3) is sent as a feed stream to Fischer-Tropsch reactor HPS 2.

Figure 7:
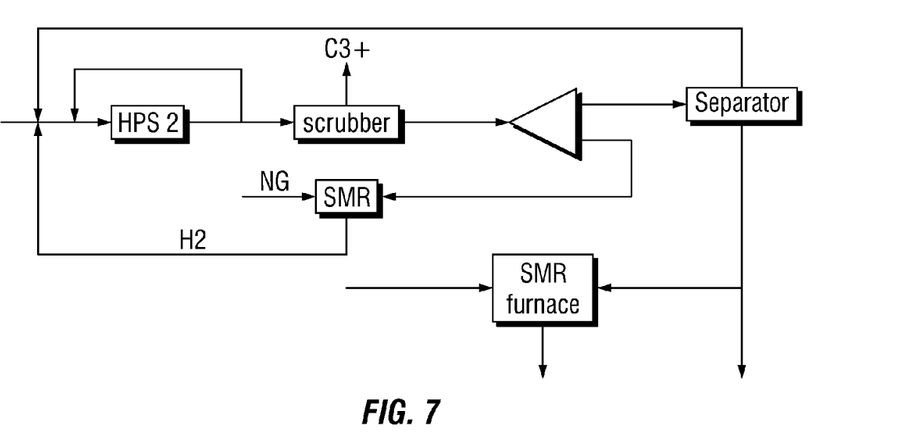

FIG. 7 concerns a part of a process line-up comprising a first Fischer-Tropsch reactor HPS 1 (not shown) and a second Fischer-Tropsch reactor HPS 2. A part of the scrubbed off-gas is sent to an SMR and a part of the scrubbed off-gas is sent to the Separator, i.e. the unit for the process of the present invention. Product gas comprising CO from step (3) is recycled from the Separator to the Fischer-Tropsch reactor HPS 2.

While the method has been described in terms of what are presently considered to be the most practical and preferred embodiments, it is to be understood that the disclosure need not be limited to the disclosed embodiments. It is intended to cover various modifications, combinations and similar arrangements included within the spirit and scope of the claims, the scope of which should be accorded the broadest interpretation so as to encompass all such modifications and similar structures. The present disclosure includes any and all embodiments of the following claims.

It should also be understood that a variety of changes may be made without departing from the essence of the invention. Such changes are also implicitly included in the description. They still fall within the scope of this invention. It should be understood that this disclosure is intended to yield a patent covering numerous aspects of the invention both independently and as an overall system and in both method and apparatus modes.

Any patents, publications, or other references mentioned in this application for patent are hereby incorporated by reference. In addition, as to each term used, it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans.

What is claimed is:

1. A method for producing a gas comprising at least 80 vol % carbon monoxide, calculated on the total volume of the gas, from a gas mixture comprising 5-50 vol % methane, 10-50 vol % carbon dioxide, 20-65 vol % carbon monoxide, 10-40 vol % hydrogen and 10-55 vol % nitrogen, calculated on the total volume of the gas mixture, said method comprising, in sequence, the following steps:
   (1) feeding a gas mixture through a column comprising an adsorbent bed, said gas mixture comprising 5-50 vol % methane, 10-50 vol % carbon dioxide, 20-65 vol % carbon monoxide, 10-40 vol % hydrogen and 10-55 vol % nitrogen, calculated on the total volume of the gas mixture,
      with upon commencement of said feeding, the bed and column being pre-saturated and pre-pressurized to a pressure in the range of 20 to 80 bar absolute (bar a) with pure hydrogen, or with a mixture of hydrogen and nitrogen, and
      discharging effluent from the other end of said bed, and continuing said feeding and said discharging until a carbon monoxide comprising gas has reached at least 45% of the length of the bed and has reached at most 80% of the length of the bed, calculated from the end of the bed at which the gas mixture is being fed; and
   (2) ceasing the feeding of the gas mixture comprising methane, carbon dioxide, carbon monoxide and hydrogen, and reducing the pressure in the column and the bed with about 5 to 10 bar a; and
   (3) rinsing the column and the adsorbent bed by feeding a gas comprising at least 95 vol % methane, or a gas mixture of methane and carbon dioxide, through the column and adsorbent bed,
      the column and bed being at a pressure in the range of 15 to 75 bar a and
      discharging effluent from the other end of said bed, and continuing said feeding and said discharging until at least 60% of the carbon monoxide that was present in the bed at the commencement of this rinsing step is discharged from the other end of said bed; and
   (4) ceasing the feeding of a gas comprising at least 95 vol % methane, or a gas mixture of methane and carbon dioxide, and reducing the pressure of the column and adsorbent bed to a pressure in the range of 1 to 5 bar a; and
   (5) rinsing the column and adsorbent bed by feeding a mixture of hydrogen and nitrogen through the column and adsorbent bed
      the column and bed being at a pressure in the range of 1 to 5 bar a, and
   (6) pressurizing the column and adsorbent bed to a pressure in the range of 15 to 75 bar a by feeding a mixture of hydrogen and nitrogen.

2. A method according to claim 1 whereby said method further comprises, in sequence, the following steps:

(A) feeding the effluent of step (1) through a column comprising an adsorbent bed,
   with upon commencement of said feeding, the bed and column being pre-saturated and pre-pressurized to a pressure in the range of 20 to 80 bar absolute (bar a) with pure hydrogen and
   discharging effluent from the other end of said bed, and continuing said feeding and said discharging until a nitrogen comprising gas has reached at least 45% of the length of the bed and has reached at most 80% of the length of the bed, calculated from the end of the bed at which the gas mixture is being fed; and
(B) ceasing the feeding of the effluent of step (1), and reducing the pressure in the column and the bed with about 2 to 5 bar a; and
(C) further reducing the pressure in the column and the bed with about 2 to 5 bar a; and
(D) reducing the pressure of the column and adsorbent bed to a pressure in the range of 1 to 5 bar a; and
(E) rinsing the column and adsorbent bed by feeding pure hydrogen through the column and adsorbent bed
   the column and bed being at a pressure in the range of 1 to 5 bar a, and
(F) pressurizing the column and adsorbent bed to a pressure in the range of 5 to 50 bar a by feeding hydrogen, and
(G) further pressurizing the column and adsorbent bed to a pressure in the range of 15 to 75 bar a by feeding hydrogen.

3. A method according to claim 1 wherein the method further comprises in sequence, the following steps:
   (I) sending at least a part of the discharged effluent of step (1) as feed to a membrane unit,
   (II) sending at least a part of the discharged effluent of step (3) as sweep gas to the membrane unit,
   (III) sending at least a part of the retentate of the membrane unit as feed to step (5), and
   (IV) sending at least a part of the permeate of the membrane unit as feed to a Fischer-Tropsch reaction.

4. A method according to claim 1, wherein repeated cycles of steps (1) to (6) are performed.

5. A method according to claim 2, wherein repeated cycles of steps (1) to (6) are performed and repeated cycles of steps (A) to (G) are performed.

6. A method according to claim 1, wherein at least two, columns that comprise an adsorbent bed are used for steps (1) to (6).

7. A method according to claim 2, wherein steps (A) to (G) are performed and at least two columns that comprise an adsorbent bed are used for steps (1) to (6) and at least two columns that comprise an adsorbent bed are used for steps (A) to (G).

8. A method according to claim 6, wherein the columns for steps (1) to (6) are connected in parallel.

9. A method according to claim 7, wherein the columns for steps (1) to (6) are connected in parallel, and the columns for steps (A) to (G) are connected in parallel.

10. A method according to claim 1, wherein the gas mixture comprising methane, carbon dioxide, carbon monoxide and hydrogen is Fischer-Tropsch off-gas.

11. A method according to claim 1, wherein at least a part of the discharged effluent of step (3) is sent as feed to a Fischer-Tropsch reaction.

12. A method according to claim 1, wherein the column and adsorbent bed are rinsed in step (5)
   by feeding a gas comprising at least 95 vol % nitrogen through the column and adsorbent bed,
   followed by feeding a mixture of hydrogen and nitrogen through the column and adsorbent bed,
   the column and bed being at a pressure in the range of 1 to 5 bar a.

13. A method according to claim 1, wherein a part of the effluent of step (2) is used as feeding gas in step (5).

14. A method according to claim 13, wherein additionally a part of the effluent of step (1) is used as feeding gas in step (5).

15. A method according to claim 1, wherein a part of the effluent of step (2) is used as feeding gas in step (6).

16. A method according to claim 15, wherein additionally a part of the effluent of step (1) is used as feeding gas in step (6).

17. A method according to claim 1, wherein repeated cycles of steps (1) to (6) are performed and a part of the effluent of step (4) is pressurized and used as feeding gas in step (3) of a next cycle.

18. A method according to claim 1, wherein a scrubbed Fischer-Tropsch off-gas from a Fischer-Tropsch reactor is fed to the column and adsorbent bed in step (1), and a part of the effluent of step (3) is sent as a recycle stream to the Fischer-Tropsch reactor that produced the off-gas.

19. A method according to claim 1, wherein a scrubbed Fischer-Tropsch off-gas from a first Fischer-Tropsch reactor is used in step (1), and a part of the effluent of step (3) is sent as a feed stream to a second Fischer-Tropsch reactor.

* * * * *